United States Patent
Sabetto

(10) Patent No.: US 11,228,540 B2
(45) Date of Patent: Jan. 18, 2022

(54) COMMUNICATION DEVICE, COMMUNICATION SYSTEM, AND COMMUNICATION METHOD

(71) Applicant: FUJITSU LIMITED, Kawasaki (JP)

(72) Inventor: Yoshikazu Sabetto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/807,840

(22) Filed: Mar. 3, 2020

(65) Prior Publication Data

US 2020/0304431 A1 Sep. 24, 2020

(30) Foreign Application Priority Data

Mar. 20, 2019 (JP) .............................. JP2019-052444

(51) Int. Cl.
| | |
|---|---|
| *H04L 12/879* | (2013.01) |
| *H04L 12/26* | (2006.01) |
| *H04L 12/947* | (2013.01) |
| *H04L 12/851* | (2013.01) |

(52) U.S. Cl.
CPC ........ *H04L 49/901* (2013.01); *H04L 43/0852* (2013.01); *H04L 47/24* (2013.01); *H04L 49/25* (2013.01)

(58) Field of Classification Search
CPC ............. G06F 13/1647; H04L 43/0852; H04L 43/0894; H04L 47/24; H04L 47/30; H04L 47/2458; H04L 47/624; H04L 49/25; H04L 49/901
See application file for complete search history.

(56) References Cited

U.S. PATENT DOCUMENTS

| | | | | |
|---|---|---|---|---|
| 6,487,212 B1 * | 11/2002 | Erimli | ....................... | G06F 5/06 370/230 |
| 6,570,875 B1 * | 5/2003 | Hegde | ................. | H04L 12/4645 370/389 |
| 6,791,979 B1 * | 9/2004 | Berl | ..................... | H04L 12/4604 370/389 |
| 7,826,469 B1 * | 11/2010 | Li | ....................... | H04L 47/6215 370/412 |

(Continued)

FOREIGN PATENT DOCUMENTS

| | | |
|---|---|---|
| JP | 2005-210606 A | 8/2005 |
| JP | 2010-161546 A | 7/2010 |

(Continued)

*Primary Examiner* — Melanie Jagannathan
(74) *Attorney, Agent, or Firm* — Fujitsu Patent Center

(57) ABSTRACT

A communication device includes: multiple queues, each of which stores a packet; an input section that inputs a concerned packet to a queue that is among the multiple queues and corresponds to a priority of the concerned packet; an adder that acquires first time when the concerned packet is input to the queue corresponding to the priority, and that adds the first time to the concerned packet; a reader that reads packets from each of the multiple queues in order from a packet with the highest priority; a calculator that acquires second time when the concerned packet is read from the queue corresponding to the priority, and that calculates delay time of the concerned packet from the difference between the first time and the second time; and a priority controller that increases the priority of the concerned packet based on the delay time.

7 Claims, 14 Drawing Sheets

(56) References Cited

U.S. PATENT DOCUMENTS

| | | | |
|---|---|---|---|
| 9,306,876 B1* | 4/2016 | Ulman | G06F 13/1647 |
| 2002/0122387 A1* | 9/2002 | Ni | H04L 47/2441 |
| | | | 370/231 |
| 2002/0176406 A1* | 11/2002 | Tsukada | H04L 65/1069 |
| | | | 370/352 |
| 2004/0001493 A1* | 1/2004 | Cloonan | H04L 47/2433 |
| | | | 370/395.42 |
| 2004/0151197 A1* | 8/2004 | Hui | H04L 47/2416 |
| | | | 370/412 |
| 2005/0163138 A1* | 7/2005 | Kanazawa | H04L 47/30 |
| | | | 370/412 |
| 2006/0268701 A1* | 11/2006 | Clark | H04L 47/10 |
| | | | 370/230 |
| 2007/0002750 A1* | 1/2007 | Sang | H04W 72/1236 |
| | | | 370/238 |
| 2007/0253332 A1* | 11/2007 | Fawaz | H04L 47/2475 |
| | | | 370/230 |
| 2009/0059937 A1* | 3/2009 | Kanada | H04L 41/5019 |
| | | | 370/401 |
| 2010/0172348 A1* | 7/2010 | Saito | H04L 47/34 |
| | | | 370/389 |
| 2010/0226371 A1* | 9/2010 | Shimonishi | H04L 49/3081 |
| | | | 370/392 |
| 2010/0278055 A1* | 11/2010 | Barry | H04J 3/0667 |
| | | | 370/252 |
| 2010/0306336 A1* | 12/2010 | Weber | H04L 12/40032 |
| | | | 709/212 |
| 2012/0236713 A1* | 9/2012 | Kakadia | H04L 47/2458 |
| | | | 370/230 |
| 2012/0275301 A1* | 11/2012 | Xiong | H04L 49/357 |
| | | | 370/230 |
| 2012/0307825 A1* | 12/2012 | Hui | H04W 40/32 |
| | | | 370/390 |
| 2013/0188482 A1* | 7/2013 | Lee | H04L 47/25 |
| | | | 370/235 |
| 2013/0235878 A1 | 9/2013 | Hirota | |
| 2014/0036695 A1* | 2/2014 | Ziegler | H04L 49/901 |
| | | | 370/252 |
| 2014/0286349 A1* | 9/2014 | Kitada | H04L 47/6215 |
| | | | 370/412 |
| 2015/0347327 A1* | 12/2015 | Blaine | G06F 3/0659 |
| | | | 711/103 |
| 2016/0006675 A1* | 1/2016 | Takase | H04L 49/3072 |
| | | | 709/223 |
| 2016/0105473 A1* | 4/2016 | Klingbeil | H04L 47/30 |
| | | | 370/260 |
| 2016/0173416 A1* | 6/2016 | Edmiston | G06F 9/4887 |
| | | | 370/419 |
| 2019/0044866 A1* | 2/2019 | Chilikin | H04L 45/38 |

FOREIGN PATENT DOCUMENTS

| | | |
|---|---|---|
| JP | 2012-239138 A | 12/2012 |
| JP | 2013-187766 A | 9/2013 |
| JP | 2013-197643 A | 9/2013 |

* cited by examiner

FIG. 12

| QUEUE ID | ... | #5 | #4 | ... |
|---|---|---|---|---|
| VID | ... | 105 | 200 | ... |
| | | – | 300 | |
| | | – | 400 | |
| | | – | 100 | |
| | | – | 101 | |

149

COMMUNICATION DEVICE, COMMUNICATION SYSTEM, AND COMMUNICATION METHOD

CROSS-REFERENCE TO RELATED APPLICATION

This application is based upon and claims the benefit of priority of the prior Japanese Patent Application No. 2019-52444, filed on Mar. 20, 2019, the entire contents of which are incorporated herein by reference.

FIELD

The embodiment discussed herein is related to a communication device, a communication system, and a communication method.

BACKGROUND

As a next-generation network, for example, a 5th generation (5G) mobile communication system, is being researched and developed. For the 5G mobile communication system, for example, approximately one tenth the delay time of the 4G mobile communication system is requested. As an example, in a mobile front haul (MFH) region coupling a remote radio head (RRH) to a baseband unit (BBU), delay time of, for example, approximately 5 µs is predicted to be requested for a layer 2 switch of each node. A delay of a packet to be transferred by the layer 2 switch may be an internal delay caused by packet processing in the device, a transmission delay on a transmission path, or a collision delay caused by a collision between packets in transmission, In the MFH region, packets are input from multiple RRHs to a single layer 2 switch, and thus a collision delay makes up a large proportion of entire delay time.

The layer 2 switch treats, as a high-priority packet, a packet for which predetermined delay time is requested, and treats, as a low-priority packet, a packet for which delay time is not requested. The layer 2 switch stores the high-priority packet and the low-priority packet in different queues and uses a quality-of-service (QoS) function to prioritize the high-priority packet over the low-priority packet and transfer the high- and low-priority packets.

An example of the related art is Japanese Laid-open Patent Publication No. 2013-197643.

SUMMARY

According to an aspect of the embodiments, a communication device includes: multiple queues, each of which stores a packet; an input section that inputs a concerned packet to a queue that is among the multiple queues and corresponds to a priority of the concerned packet; an adder that acquires first time when the concerned packet is input to the queue corresponding to the priority, and that adds the first time to the concerned packet; a reader that reads packets from each of the multiple queues in order from a packet with the highest priority; a calculator that acquires second time when the concerned packet is read from the queue corresponding to the priority, and that calculates delay time of the concerned packet from the difference between the first time and the second time; and a priority controller that increases the priority of the concerned packet based on the delay time.

The object and advantages of the invention will be realized and, attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a VID table;

DESCRIPTION OF EMBODIMENT(S)

However, when high-priority packets collide with each other in transmission, one of the high-priority packets stands by until the transmission of the other high-priority packet is completed. It is, therefore, difficult to suppress a collision delay.

The present disclosure aims to provide a communication device, a communication system, and a communication method that may suppress a delay caused by a collision between packets.

According to an aspect, a delay caused by a collision between packets may be suppressed.

Figure 1:
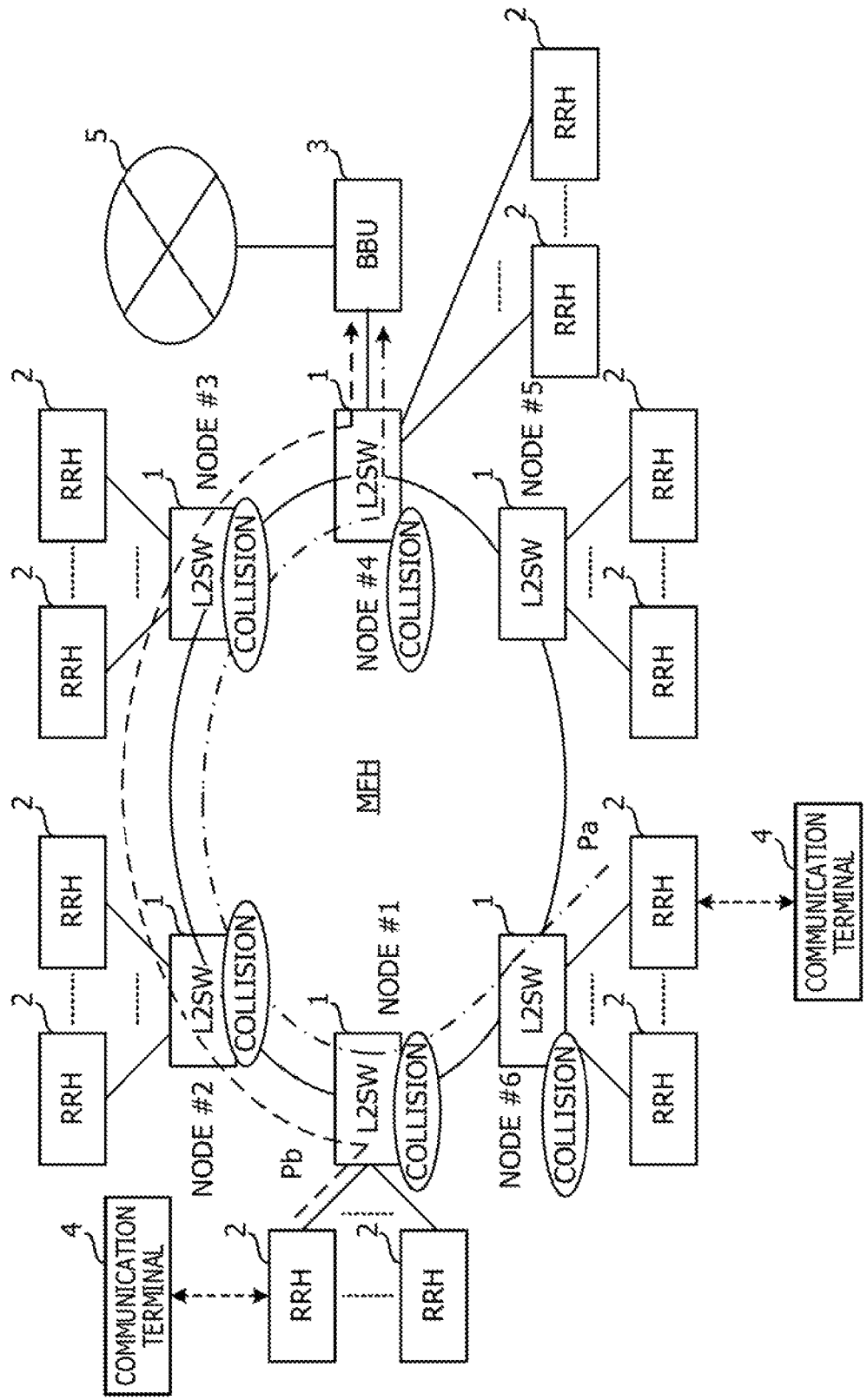
FIG. 1 illustrates an example of a configuration of a network in an MFH region of a mobile communication system.

FIG. 1 illustrates an example of a configuration of a network in an MFH region of a mobile communication system. The mobile communication system is an example of a communication system. The mobile communication system includes multiple layer 2 switches 1 coupled to each other in a ring form and relays communication between RRHs 2 and a BBU 3. As an example, each of nodes #1 to #6 includes a single layer 2 switch 1 coupled to multiple RRHs 2 in a star form. Each of the RRHs 2 wirelessly communicates with a communication terminal 4, such as a smartphone.

The layer 2 switch 1 of the node #4 is coupled to the BBU 3. The BBU 3 is coupled to a core network 5.

In the network, paths Pa and Pb are set as communication paths between the RRHs 2 and the BBU 3, for example. The path Pa extends through the layer 2 switches 1 of the nodes #6, #1, #2, #3, and #4 in this order. The path Pb extends through the layer 2 switches 1 of the nodes #1, #2 #3, and #4 in this order. A packet to be transferred in the path Pa and a packet to be transferred in the path Pb are identified by different virtual local area network identifiers (VIDs). The VIDs are included in virtual local area network (VLAN) tags added to the packets, for example.

Since packets are transmitted from multiple RRHs each of the layer 2 switches 1 on the paths Pa and Pb, packets may collide with each other in each of the layer 2 switches 1. As described below, a collision delay caused by a collision between packets occurs in a layer 2 switch 1 according to a comparative example.

Figure 2:
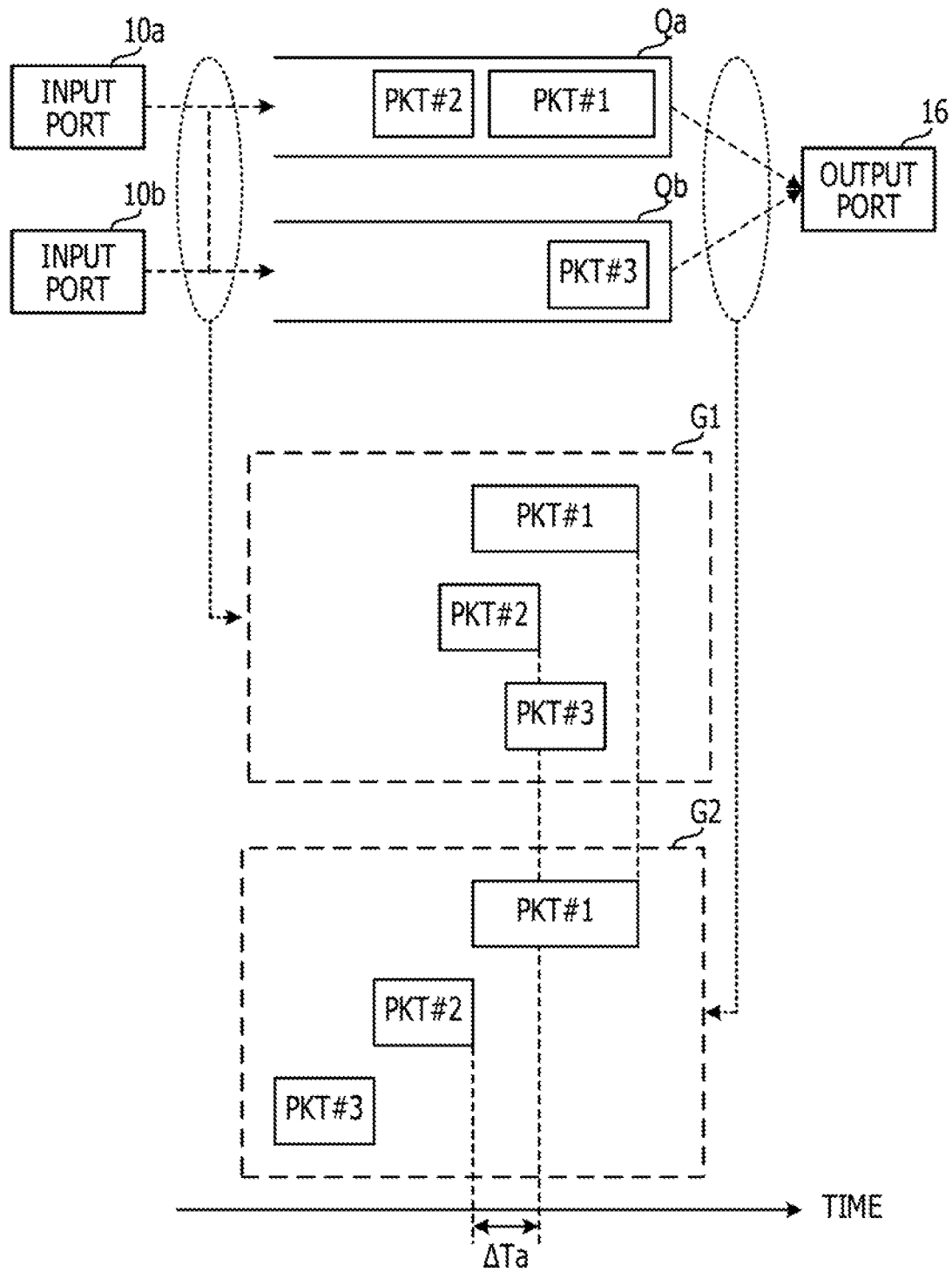
FIG. 2 illustrates an example of a collision delay in a layer 2 switch according to a comparative example.

FIG. 2 illustrates an example of the collision delay in the layer 2 switch 1 according to the comparative example, The layer 2 switch 1 includes input ports 10a and 10b, an output port 16, a high-priority queue Qa, and a low-priority queue Qb. Packets are input to the input packets 10a and 10b. The packets are output from the output port 16. Among the packets, a high-priority packet is stored in the high-priority queue Qa, and a low-priority packet is stored in the low-priority queue Qb. Predetermined delay time is requested for the high-priority packet. Delay time is not requested for the low-priority packet.

A reference sign G1 indicates time when the packets, are input from the input ports 10a and 10b, while a reference sign G2 indicates time when the packets are output to the output port 16. In this example, a high-priority packet (PKT) #1 and a low-priority packet (PKT) #3 are input from the input port 10a, and a high-priority packet (PKT) #2 is input from the input port 10b. The PKT #1 is input earliest, the PKT #3 is input second earliest, and the PKT #2 is input latest.

The PKT #3 is stored in the low-priority queue Qb, and the PKTs #1 and #2 are stored in the high-priority queue Qa. The high-priority queue Qa and the low-priority queue Qb are First-In-First-Out (FIFO) queues. Each of the high-priority queue Qa and the low-priority queue Qb outputs packets in the order in which packets have been input to the queue. Since the PKTs #1 and #2 are stored in the high-priority queue Qa, and the PKT #1 is input earlier than the PKT #2, the PKT #1 is read from the high-priority queue Qa earlier than the PKT #2, The PKTs #1 and #2 stored in the high-priority queue Qa are read with priority over the PKT #3 stored in the low-priority queue Qb. Thus, the PKTs #1, #2, and #3 are output to the output port 16 in this order. It is assumed that the layer 2 switch 1 outputs the packets from the high-priority queue Qa and the low-priority queue Qb via cut-through switching.

Although the PKT #2 is input later than the PKT #3, the priority of the PKT #2 is higher than the priority of the PKT #3, and the PKT #2 is output earlier than the PKT #3. Thus, the PKT #2 is not delayed due to a collision between the PKT #2 and the PKT #3.

However, since the PKT #2 is input later than the PKT #1 having the same priority as the PKT #2, the PKT #2 stands by until the reading of the PKT #1 from the high-priority queue Qa is completed. Thus, a collision delay ΔTa of the PKT #2 occurs due to a collision between the PKT #2 and the PKT #1. The collision delay ΔTa varies depending on a data length of the PKT #1.

A layer 2 switch 1 according to an embodiment measures delay time from the time when a packet is input to a queue to the time when the packet is output from the queue. The layer 2 switch 1 according to the embodiment changes a priority of the packet based on the delay time, Since the packet with the priority increased in the foregoing manner is output from a queue in, a downstream-side layer 2 switch 1 on a priority basis, the delay time is reduced.

Figure 3:
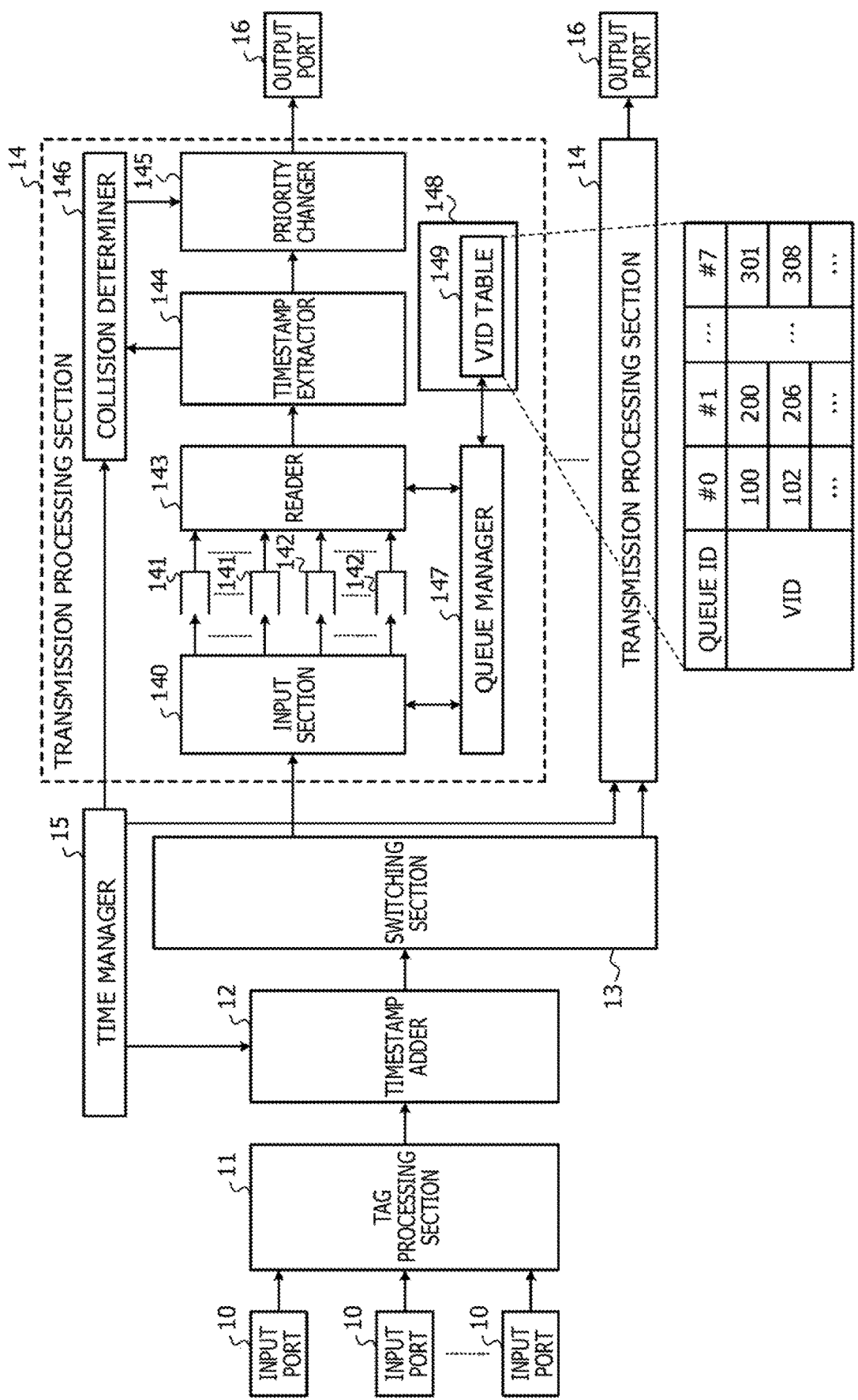
FIG. 3 illustrates an example of a configuration of a layer 2 switch.

FIG. 3 illustrates an example of a configuration of the layer 2 switch 1. The layer 2 switch 1 includes multiple input ports 10, a tag processing section 11, a timestamp adder 12, a switching section 13, multiple transmission processing sections 14, a time manager 15, and multiple output ports 16. The layer 2 switch 1 is an example of a communication device.

The tag processing section 11, the timestamp adder 12, the switching section 13, the multiple transmission processing sections 14, and the time manager 15 are configured as either or both of a circuit, such as a field programmable gate array (FPGA) or an application specific integrated circuit (ASIC), and a software function of driving a processor, such as a central processing unit (CPU).

Each of the input ports 10 receives a packet and outputs the packet to the tag processing section 11. Each of the input ports 10 includes circuits, such as a photodiode and an amplifier, and converts a received packet from an optical signal to an electric signal. Each of the input ports 10 is an example of a receiving port that receives a packet.

The tag processing section 11 adds a tag to a packet and acquires various information from the tag added to the packet. The tag processing section 11 outputs the packet to the timestamp adder 12.

The timestamp adder 12 acquires time within the layer 2 switch 1 from the time manager 15 and adds the acquired time to the packet. The timestamp adder 12 is an example of an adder. The acquired by the timestamp adder 12 is an example of first time.

The time manager 15 includes, for example, real-time clock circuit and counts the time within the layer 2 switch 1. The time manager 15 outputs a counter value indicating the time to the timestamp adder 12 in accordance with a request from the timestamp adder 12. The time manager 15 is an example of a counter that counts the time within the layer 2 switch.

The timestamp adder 12 outputs a packet having a timestamp added thereto to the switching section 13.

The switching section 13 outputs a packet to a transmission processing section 14 that is a destination of the packet. For example, the switching section 13 selects, based on a header of the packet or a VID within a VLAN tag of the packet, the transmission processing section 14 that is the output destination.

Each of the transmission processing sections 14 includes an input section 140, multiple high-priority queues 141, multiple low-priority queues 142, a reader 143, a timestamp extractor 144, a priority changer 145, a collision determiner 146, a queue manager 147, and a storage section 148. A VID table is stored in the storage section 148. The multiple high-priority queues 141, the multiple low-priority queues 142 and the storage section 148 are configured as a memory or the like, for example.

The input section 140 determines a priority of a packet and inputs the packet to a high- or low-priority queue 141 or 142 corresponding to the priority of the packet.

Figure 4:
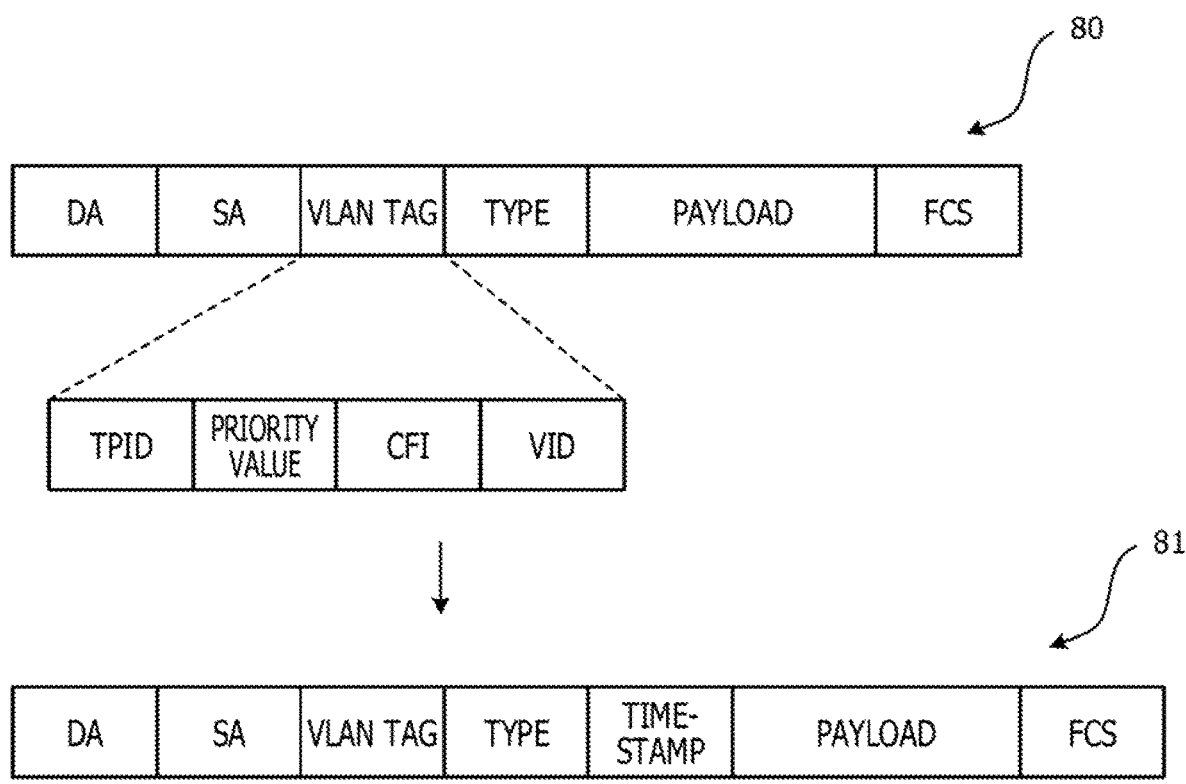
FIG. 4 illustrates an example of the format of a packet.

FIG. 4 illustrates an example of the format of the packet. In this example, the packet is an Ethernet (registered trademark, the same applies to the following) frame.

A reference sign 80 indicates an example of the packet received by an input port 10. The packet includes a destination address (DA), a source address (SA), a VLAN tag, a type, a payload, and a frame check sequence (FCS).

The VLAN tag includes a tag protocol identifier (TPID), a priority value, a canonical format identifier (CFI), and a VID. The priority value is any of 0, 1, 2, . . . , and 7 and indicates the priority of the packet. 7 indicates the highest priority, and 0 indicates the lowest priority.

A reference sign 81 indicates an example of the packet having a timestamp added thereto. The timestamp is inserted between the type and the payload as an example. The timestamp includes information of time when the packet is input to the high- or low-priority queue 141 or 142.

Refer to FIG. 3 again. The multiple high-priority queues 141 correspond to the priority values of 4, 5, 6, and 7, respectively. The multiple low-priority queues 142 correspond to the priority values of 0, 1, 2, and 3, respectively, The input section 140 inputs the packet to the high- or low-priority queue 141 or 142 corresponding to the priority value of the packet.

The reader 143 reads packets from the multiple high-priority queues 141 and the multiple low-priority queues 142 in order from a packet with the highest priority. For example, the reader 143 reads the packets in order from a high-priority queue 141 corresponding to the highest priority value. The reader 143 reads packets from each of the high-priority queues 141 or each of the low-priority queues 142 in the order in which the packets have been input to the high-priority queue 141 or the low-priority queue 142. A reading scheme of the reader 143 is weighted round-robin as an example, but is not limited to this.

The queue manager 147 manages packets stored in the high-priority queues 141 and the low-priority queues 142. The queue manager 147 acquires, from the input section 140, VIDs of the packets input to the high-priority queues 141 and the low-priority queues 142 and acquires, from the reader 143, VIDs of the packets output from the high-priority queues 141 and the low-priority queues 142, The queue manager 147 registers the VIDs acquired from the input section 140 in the VID table 149 and deletes the VIDs acquired from the reader 143 from the VID table 149. The queue manager 147 is an example of an acquirer that acquires a VID.

In the VI D table 149, VIDs of stored packets are registered in the order in which the packets have been input for each of queue IDs ("#1" to "#7") identifying the high-priority queues 141 and the low-priority queues 142 based on the priority values. Thus, the queue manager 147 manages the VIDs of the packets stored in the high-priority queues 141 and the low-priority queues 142.

The queue manager 147 searches the VID table 149 in accordance with a request from the input section 140 and outputs a result of the search to the input section 140 to enable a function of inhibiting packet overtaking described later.

The timestamp extractor 144 extracts a timestamp from a packet input from the reader 143 and outputs the extracted timestamp to the collision determiner 146. The timestamp extractor 144 deletes the timestamp from the packet and outputs the packet to the priority changer 145.

When the packet is read from a high- or low-priority queue 141 or 142, the collision determiner 146 acquires the time within the layer 2 switch 1 from the time manager 15 and calculates delay time of the, packet from the difference between the time acquired from the time manager 15 and time acquired from the timestamp extractor 144, The collision determiner 146 is an example of a calculator. The time acquired from the time manager 15 is an example of second time.

The time manager 15 may be installed outside the layer 2 switch 1, for example. In the case where the time manager 15 is installed in the layer 2 switch 1, transmission delays between the timestamp adder 12, and the collision determiner 146 and the time manager 15 may be suppressed, and the time within the layer 2 switch 1 may be acquired with high accuracy. The collision determiner 146 outputs the delay time to the priority changer 145.

The priority changer 145 increases a priority of a high-priority packet among packets input from the timestamp extractor 144 based on delay time of the high-priority packet. Thus, since a priority of a packet with long delay time is increased, the packet is read from a high-priority queue 141 in a downstream-side layer 2 switch 1 on a priority basis. This suppresses a further increase in the delay time of the packet The priority changer 145 is an example of a priority controller.

Since predetermined delay time is not requested for low-priority packets, the priority changer 145 does not change priorities of the low-priority packets. Thus, the priorities of the low-priority packets are the same as the priorities when the low-priority packets are initially transmitted. The low-priority packets, however, are not limited to this. The priority changer 145 may increase a priority of a low-priority packet based on delay time of the low-priority packet. The priority changer 145 outputs the packets to the output port 16.

The output port 16 includes a circuit, such as a laser diode (LD), for example, The output port 16 converts each of the packets from an electric signal to an optical signal and outputs the packet to a transmission path, such, as an optical fiber. Each of the packets is transmitted to a downstream-side layer 2 switch 1 or the BBU 3 through the transmission path, The output port 16 is an example of a transmitting port that transmits a packet to a downstream-side layer 2 switch 1 or the BBU 3.

Figure 5:
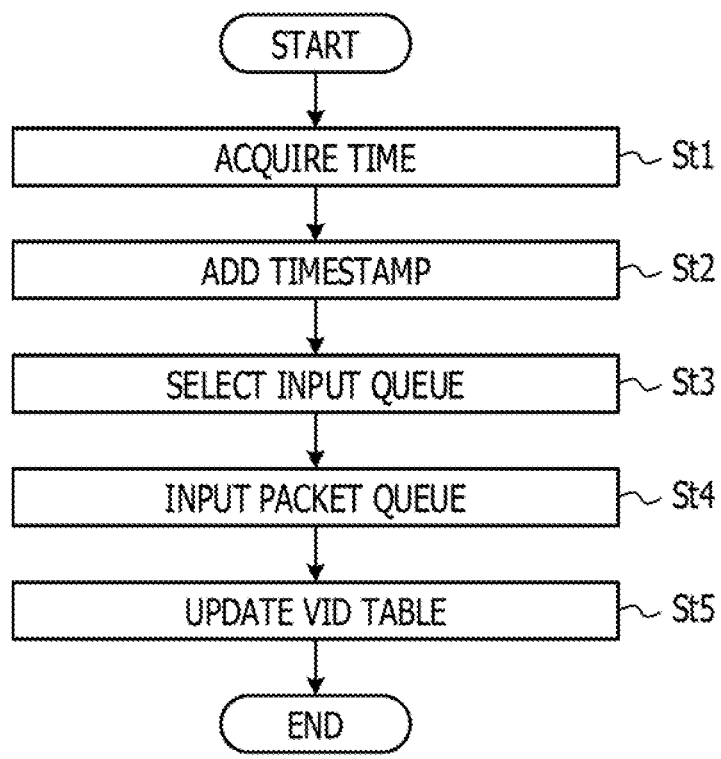
FIG. 5 is a flowchart illustrating an, example of a process to be executed upon the reception of a packet.

FIG. 5 is a flowchart illustrating an, example of a process to be executed upon the reception of a packet. This process is an example of a communication method according to the embodiment.

When a packet is input to the timestamp adder 12, the timestamp adder 12 acquires the time within the layer 2 switch 1 from the time manager 15 (in step St1). Then, the timestamp adder 12 adds a timestamp indicating the acquired time to the packet (in step St2).

Then, the input section 140 selects a high- or low-priority queue 141 or 142 as an input destination of the packet based on the priority of the packet (in step St3). Then, the input section 140 inputs the packet to the high- or low-priority queue 141 or 142 selected as the input destination (in step St4). Therefore, the packet is stored in the high- or low-priority queue 141 or 141

Then, the queue manager 147 acquires the VID of the packet and a queue ID of the high- or low-priority queue 141 or 142 as the input destination from the input section 140 and updates the VID table 149 based on the VID and the queue ID (in step St5). Therefore, the VID of the packet newly stored is added to a queue ID field of the VID table 149. In this manner, the process is executed upon the reception of the packet.

Figure 6:
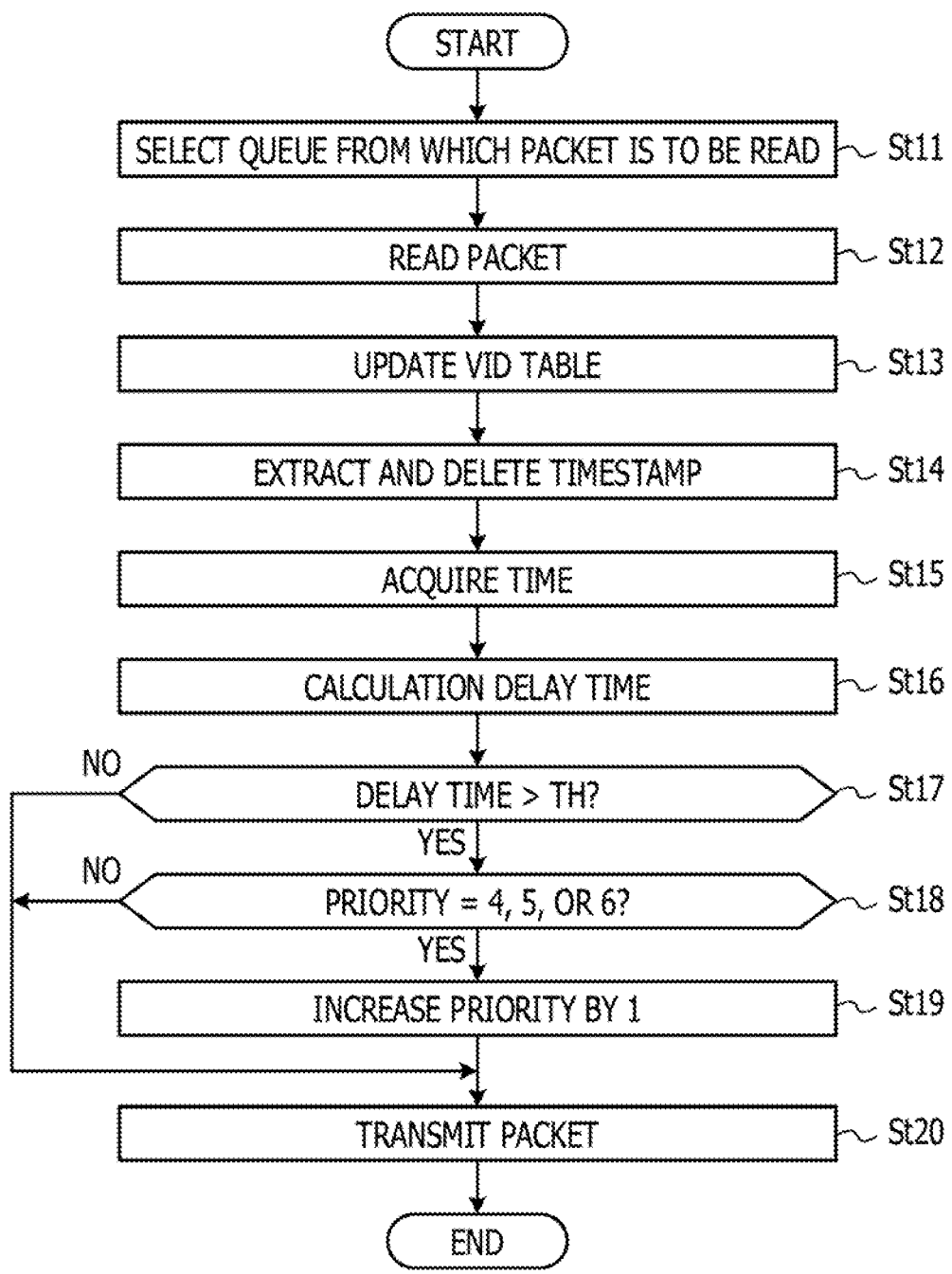
FIG. 6 is a flowchart illustrating an example of a process to be executed in the transmission of a packet.

FIG. 6 is a flowchart illustrating an example of a process to be executed in the transmission of a packet. This process is an example of the communication method according to the embodiment.

The reader 143 selects, from among the high-priority queues 141 and the low-priority queues 142, a queue from which a packet is to be read, based on the timing of transmitting the packet (in step St11). In this case, the reader 143 selects the high-priority queues 141 with priority over the low-priority queues 142 and selects a queue corresponding to the highest priority from among the high-priority queues 141 or the low-priority queues 142.

Then, the reader 143 reads the packet from the high- or low-priority queue 141 or 142 selected as the queue from which the packet is to be read (in step St12).

Then, the queue manager 147 acquires the VID of the packet read by the, reader 143 and a queue ID of the high- or low-priority queue 141 or 142 from which the packet has been read, and updates the VID table 149 based on the VID and the queue ID (in step St13). Therefore, the VID of the read packet is deleted from the queue ID field of the VID table 149.

Then, the timestamp extractor 144 extracts a timestamp from the packet and deletes the timestamp from the packet (in step St14). The timestamp extractor 144 outputs the extracted timestamp to the collision determiner 146.

Then, the collision determiner 146 acquires the time, within the layer 2 switch 1 from the time manager 15 (in step St15). Then, the collision determiner 146 calculates delay time of the read packet from the difference between the acquired time and time indicated by the timestamp (in step St16). For example, the delay time is calculated as the difference between the time when the packet is input to the high or low-priority queue 141 or 142 and the time when the packet is read from the high- or low-priority queue 141 or 142, Appropriate correction may be executed in the calculation of the delay time based on the configuration of the layer 2 switch 1. The collision determiner 146 outputs the delay time to the priority changer 145.

Then, the priority changer 145 compares the delay time with a predetermined threshold TH (in step St17). The threshold TH is, for example, a value based on delay time requested for the design of the communication system.

When the delay time is longer than the threshold TH (Yes in step St17), the priority changer 145 determines whether the priority of the packet is any of 4, 5, and 6 (in step St18). In this case, the priority changer 145 determines whether the packet is a high-priority packet and whether the priority of the packet is lower than the maximum value, which is 7.

When the priority of the packet is any of 4, 5, and 6 (Yes in step St18), the priority changer 145 increases the priority by 1 (in step S19). Thus, the packet is read from a high-priority queue 141 in a downstream-side layer 2 switch 1 on a priority basis. This suppresses a further increase in the delay time. Then, the output port 16 transmits the packet (in step St20).

When the delay time is equal to or shorter than the threshold TH (No in step St17), for example, the delay time requested for the communication system is satisfied and the priority changer 145 does not change the priority (or does not execute step St19). After that, the output port 16 transmits the packet (in step St20).

As described above, when the delay time is longer than the threshold TH, the priority changer 145 increases the priority. Since the threshold TH based on the request for the communication system is set in the layer 2 switch 1, the layer 2 switch 1 may transfer a packet with delay time satisfying the request for the communication system.

When the priority is any of 0, 1,2, 3, and 7 (No in step St18), the packet is a low-priority packet or the priority of the packet is the maximum value, which is 7, and the priority changer 145 does not change the priority (or does not execute step St19). After that, the output port 16 transmits the packet (in step St20). In this manner, the process is executed in the transmission of the packet.

Figure 7:
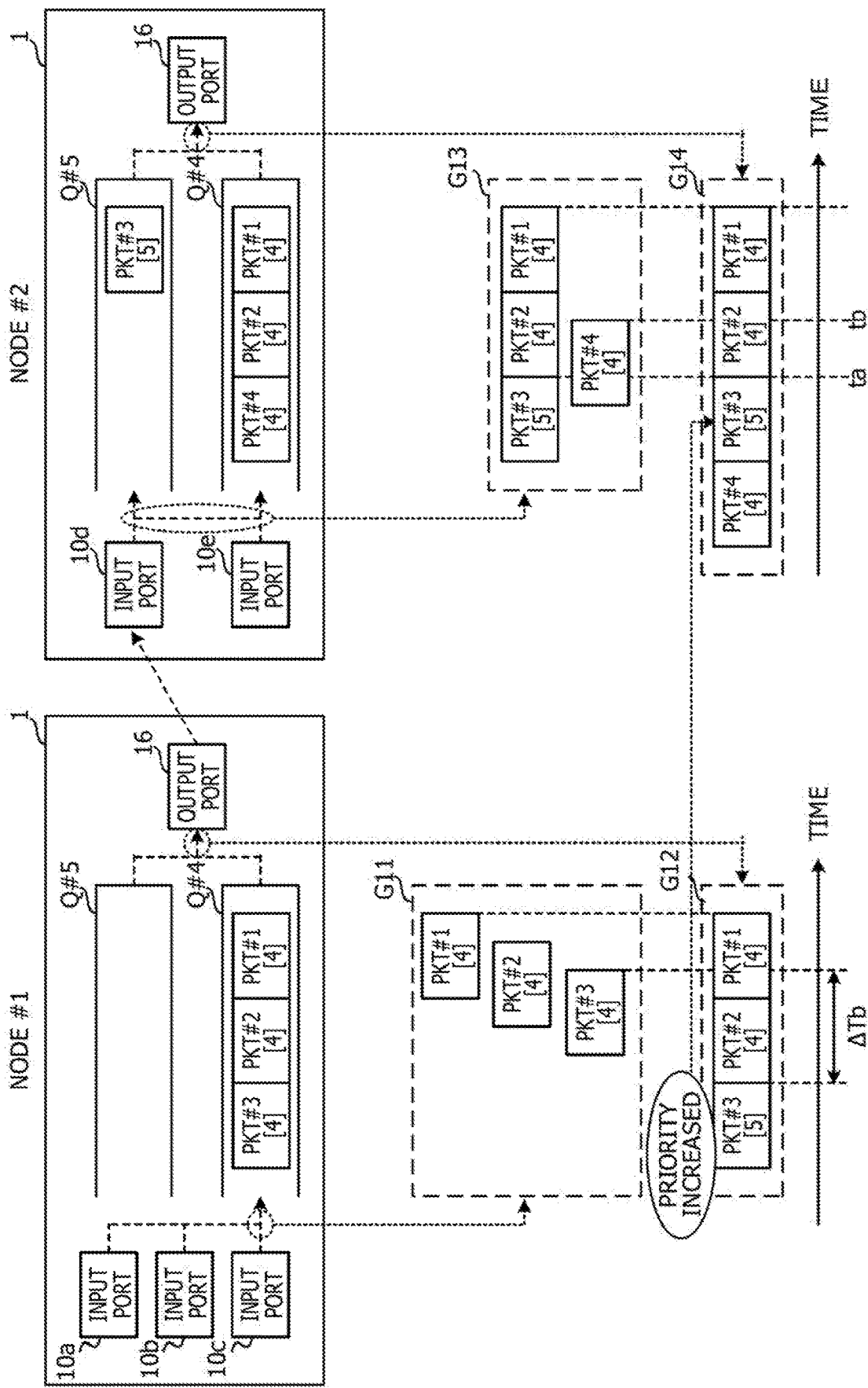
FIG. 7 illustrates an operation example of layer 2 switches when a priority of a packet is increased.

FIG. 7 illustrates an operation example of layer 2 switches 1 when a priority of a packet is increased. This example describes the case where the packet is transferred from the layer 2 switch 1 of the upstream-side node #1 to the layer 2 switch 1 of the downstream-side node #2.

FIG. 7 illustrates input ports 10*a* to 10*c* as the input ports 10 of the node #1 and input ports 10*d* and 10*e* as the input ports 10 of the node #2. FIG. 7 also illustrates, as high-priority queues 141, a high-priority queue Q #4 for storing a packet with the priority of 4 and a high-priority queue Q #5 for storing a packet with the priority of 5.

A reference sign G11 indicates time when packets are input from the input ports 10*a* to 10*c* in the layer 2 switch 1 of the node #1, while a reference sign G12 indicates time when the packets are output from the output port 16 in the layer 2 switch 1 of the node #1.

The layer 2 switch 1 of the node #1 receives high-priority packet PKTs #1 to #3 at the input ports 10*a* to 10*c*. Priorities of the PKTs #1 to #3 are 4 as an example (refer to [4]). The PKTs #1 to #3 are input to the high-priority queue Q #4 for packets with the priority of 4. Among the PKTs #1 to #3, the PKT #1 is input earliest and the PKT #3 is input latest.

The PKTs #1 to #3 are read from the high-priority queue Q #4 in the order in which the PKTs #1 to #3 have been input to the high-priority queue Q #4. Since the PKT #3 stands by until the reading of the preceding PKTs #1 and #2 is completed, delay time ΔTb occurs due to collisions between the PKT #3 and the PKTs #1 and #2. Since the delay time ΔTb is longer than the threshold TES, the priority of the PKT #3 is increased to 5 (refer to [5]). Since delay time of the PKT #2 is equal or shorter than the threshold TH, the priority of the PKT #2 is not changed.

A reference sign G13 indicates time when packets are input from the input ports 10*d* and 10*e* in the layer 2 switch 1 of the node #2, while a reference sign G14 indicates time when the packets are output from the output port 16 in the layer 2 switch 1 of the node #2.

The layer 2 switch 1 of the node #2 receives the PKTs #1 to #3 from the input port 10*d* and receives the high-priority packet PKT #4 from the input port 10*e*. The priority of the PKT #4 is 4 as an example (refer to [4]). The PKT #4 is input earlier than the PKT #3 and later than the PKTs #1 and #2.

The PKTs #1, #2, and #4 are input to the high-priority queue Q #4 for packets with the priority of 4. The PKT #3 is input to the high-priority queue Q #5 for packets with the priority of 5. Among the PKTs #1, #2, and #4 with the priority of 4, the PKT #1 is input earliest, the PKT #2 is input second earliest, and the PKT #4 is input latest. It is assumed that a packet is not stored in the high-priority queues Q #4 and Q #5 immediately before the PKTs #1 to #4 are input.

The PKTs #1, #2 and #4 are read from the high-priority queue Q #4 in the order in which the PKTs #1, #2, and #4 have been input to the high-priority queue Q #4. The PKT #3 is read from the high-priority queue Q #5.

The PKTs #1 to #3 are sequentially input from the input port 10*d*. Thus, when the PKTs #1 and #2 are stored in the high-priority queue Q #4, the PKT #3 is not yet stored in the high-priority queue Q #5. Therefore, the PKTs #1 and #2 are output from the high-priority queue Q #4 earlier than the PKT #3.

The PKT #4 is input to the high-priority queue Q #4 after the PKT #3 with the same priority as the PKT #4 is stored. Therefore, the time when the PKT #4 is input is substantially the same as the time when the PKT #3 is input. However, since the priority of the PKT #3 is higher than the priority of the PKT #4, the PKT #3 is output from the high-priority queue Q #5 earlier than the PKT #4.

Thus, the PKTs #1 to #4 are output to the output port 16 in this order. This suppress an increase, caused by a collision between the PKTs #3 and #4, in delay time of the PKT #3. If the layer 2 switch 1 of the node #1 does not increase the priority of the PKT #3 to 5, the PKT #4 input to the high-priority queue Q #4 interrupts and takes precedence over the PKT #3, which increases the delay time of the PKT #3.

In this case, in the layer 2 switch 1 of the node #1, since the input section 140 inputs the PKTs #1 to #3 received by the multiple input ports 10a to 10c to the high-priority queue Q #4, a collision delay of the PKT #3 input latest occurs. However, the priority changer 145 increases the priority of the PKT #3, which suppresses a further increase, caused by the collision, in the delay time of the PKT #3 in the layer 2 switch 1 of the downstream-side node #2.

The tag processing section 11 may add an intra-device tag to a packet.

Figure 8:
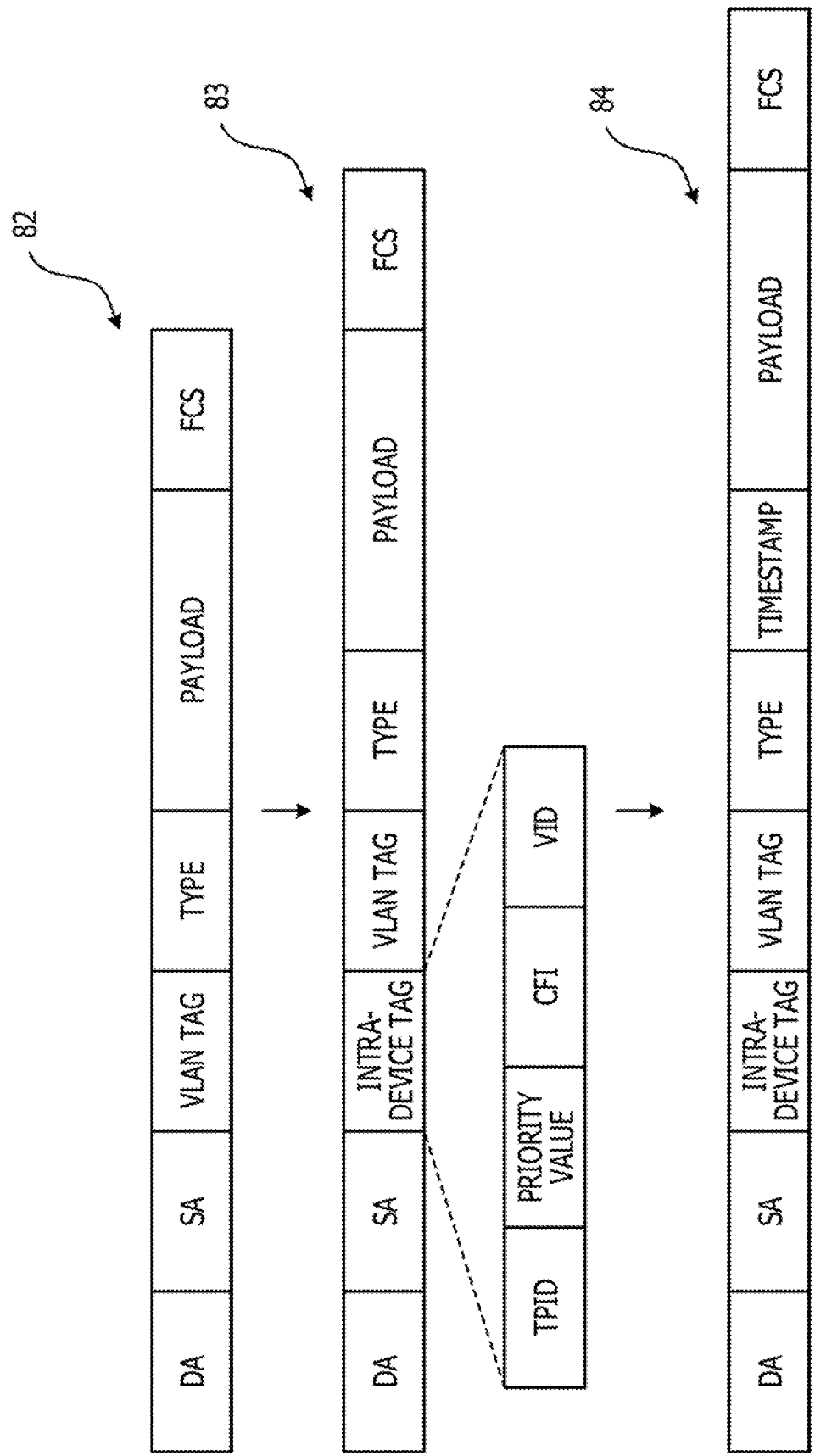
FIG. 8 illustrates an example of he format of a packet when an intra-device tag is added.

FIG. 8 illustrates an example of the format of the packet when the intra-device tag is added to the packet. Details that are illustrated in FIG. 8 and common to those illustrated in FIG. 4 are not described below.

A reference sign 82 indicates an example of the packet received by an input port 10. The packet is the same as or similar to the packet indicated by the reference sign 80 in FIG. 4.

A reference sign 83 indicates an example of the packet having the intra-device tag added by the tag processing section 11. The tag processing section 11 inserts the intra-device tag between the SA and the VLAN tag, for example. The intra-device tag has the same configuration as the VLAN tag. The priority changer 145 changes the priority value of the intra-device tag.

A reference sign 84 indicates an example of the packet having a time stamp added thereto. The timestamp is inserted between the type and the payload as an example.

Figure 9:
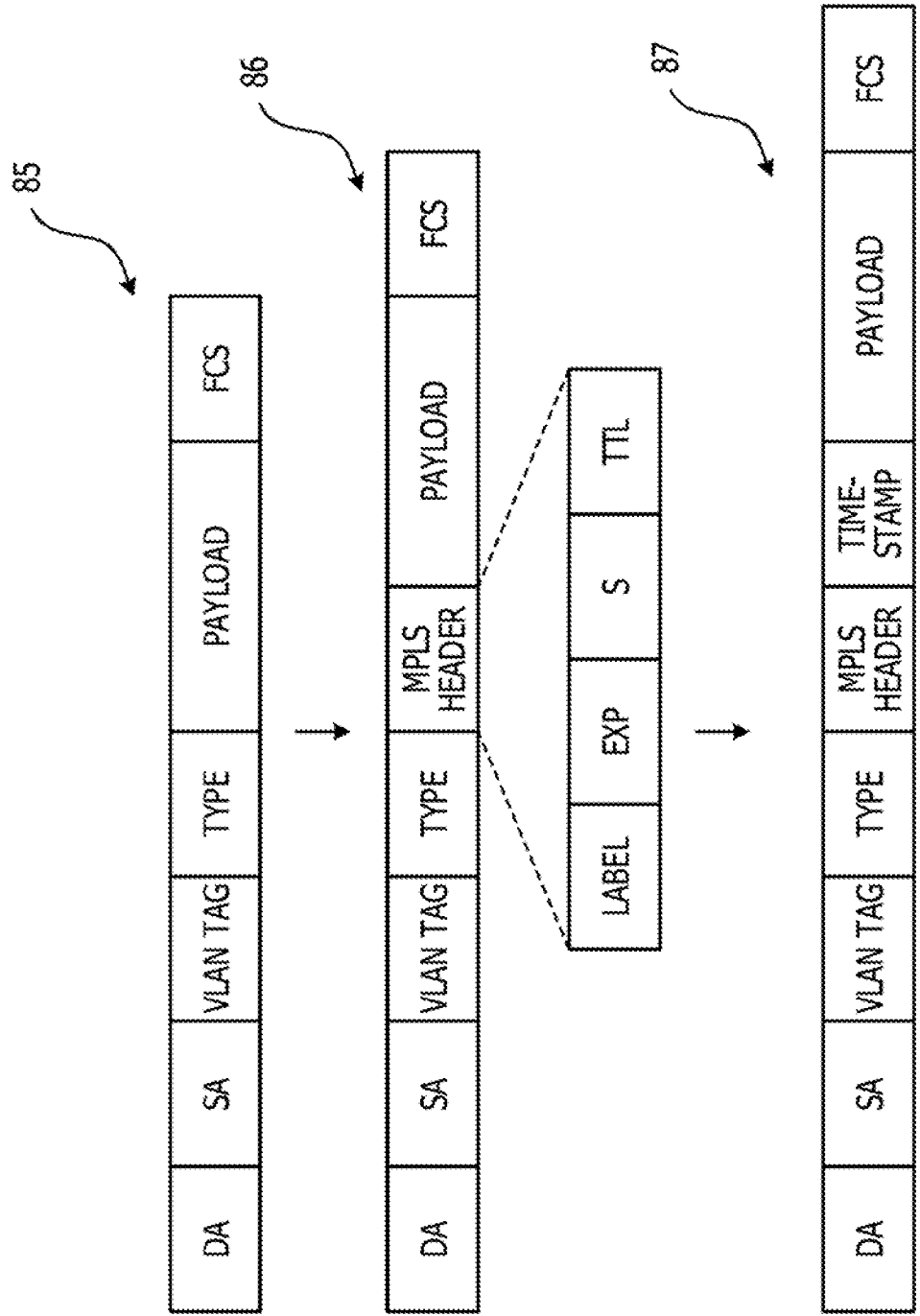
FIG. 9 illustrates another example of the format of the packet when the intra-device tag is added.

FIG. 9 illustrates another example of the format of the packet when the intra-device tag is added to the packet. Details illustrated in FIG. 9 and common to those illustrated in FIG. 4 are not described below.

A reference sign 85 indicates an example of the packet received by an input port 10. The packet is the same as or similar to the packet indicated by the reference sign 80 in FIG. 4.

A reference sign 86 indicates an example of the packet having the intra-device tag added by the tag processing section 11. The tag processing section 11 adds a multi-protocol label switching (MPLS) header as the intra-device tag, The tag processing section 11 inserts the intra-device tag between the type and the payload, for example.

The MPLS header has a label, an EXP region, an S region, and a time-to-live (TTL) region. In the EXP region, a priority value that is any of 0, 1, . . . , and 7 is stored. The priority changer 145 changes the priority value stored in the EXP region.

A reference sign 87 indicates an example of the packet having a timestamp added thereto. The timestamp is inserted between the MPLS header and the payload.

(Function of Inhibiting Packet Overtaking)

When delay time of a packet exceeds the threshold TH, the priority of the packet is increased. Thus, the packet may overtake a preceding packet on the path Pa or Pb in a downstream-side layer 2 switch 1. When the packet overtaking occurs, the order in which the packets are received is incorrect and the original data is not normally restored from the packets.

Figure 10:
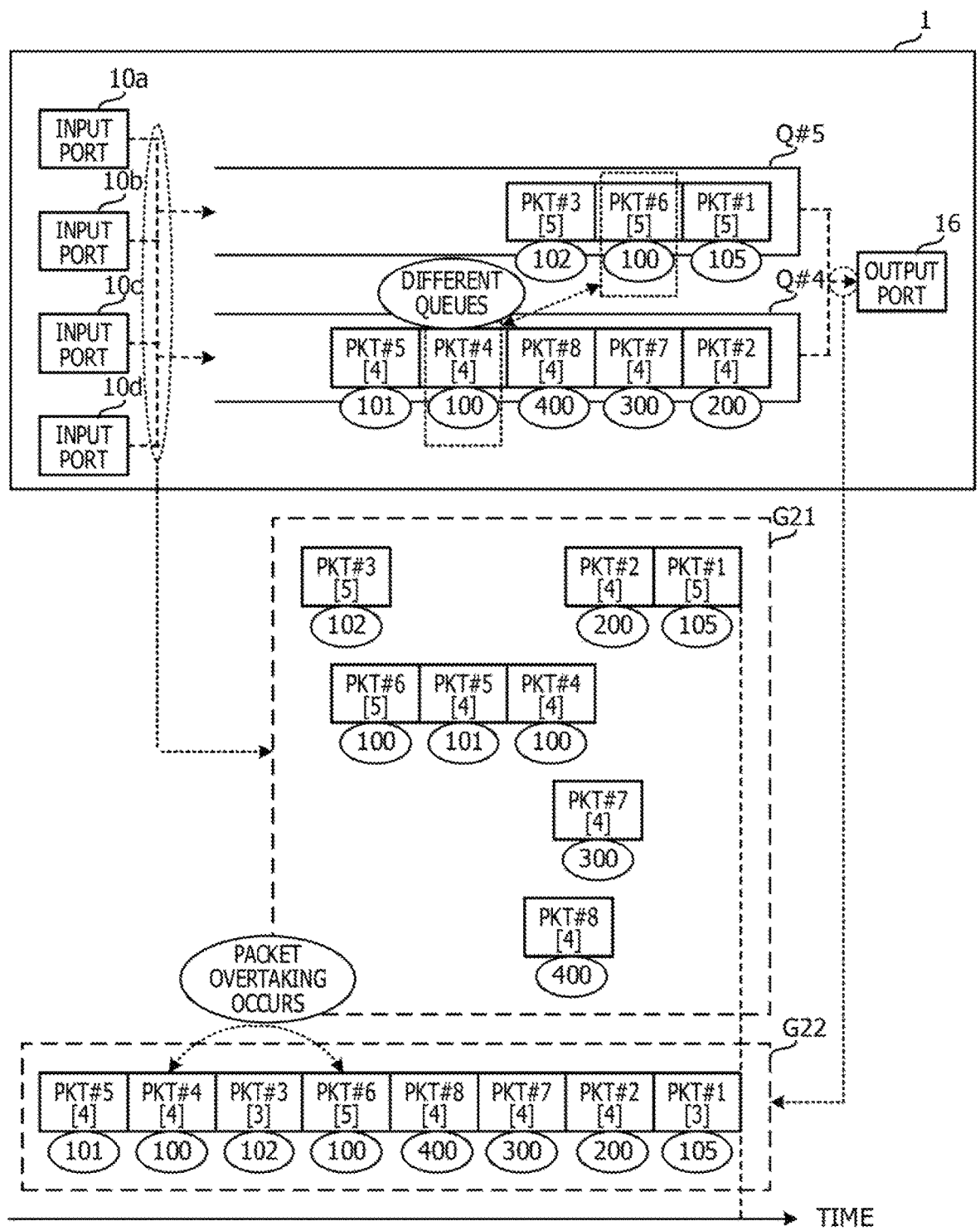
FIG. 10 illustrates n example of packet overtaking.

FIG. 10 illustrates an example of the packet overtaking. In FIG. 10, numbers added to high-priority packet PKTs #1 to #8 indicate VIDs. This example describes the case where the preceding PKT #6 with a VID "100" is overtaken by the succeeding PKT #4 with the same VID "100".

FIG. 10 illustrates input ports 10a to 10d as the input ports 10 of the node #1. FIG. 10 also illustrates, as high-priority queues 141, the high-priority queue Q #4 for storing packets with the priority of 4 and the high-priority queue Q #5 for storing packets with the priority of 5.

A reference sign G21 indicates time when the packets are input from the input ports 10a to 10d, while a reference sign G22 indicates time when the packets are output to the output port 16.

The layer 2 switch 1 receives the PKTs #1 to #3 at the input port 10a and receives the PKTs #4 to #6 at the input port 10b. The layer 2 switch 1 receives the PKT #7 at the input port 10c and receives the PKT #8 at the input port 10d.

Priorities of the PKTs #1, #3, and #6 are 5 as an example (refer to [5]). Priorities of the PKTs #2, #4, #5, #7, and #8 are 4 as an example (refer to [4]). It is assumed that the priority of the PKT #6 is increased from 4 to 5 by the priority changer 145 in an upstream-side layer 2 switch 1.

The PKTs #2, #4, #5, #7, and #8 are input to the high-priority queue Q #4 for packets with the priority of 4. The PKTs #1, #3, and #6 are input to the high-priority queue Q #5 for packets with the priority of 5. The PKT #6 with the VID "100" is input to the high-priority queue Q #5 after the preceding PKT #4 is input to the high-priority queue Q #4.

The PKTs #6 and #4 are stored in the high-priority queues Q #5 and Q #4 for the different priorities, respectively. A packet stored in the high-priority queue Q #5 is read and output to the output port 16 with priority over a packet stored in the high-priority queue Q #4. Thus, the PKT #6 stored in the high-priority queue Q #5 later than the PKT #4 is read from the high-priority queue Q #5 earlier than the preceding PKT #4. Therefore, the PKT #6 overtakes the PKT #4.

The PKT #6 with the priority of 5 is input to the same high-priority queue Q #4 as the PKT #4 without being input to the high-priority queue Q #5 in the layer 2 switch 1. Therefore, the reversal of the order in which the PKTs #4 and #6 with the same VID "100" are output is inhibited and the PKT #6 is inhibited from overtaking the PKT #4.

Figure 11:
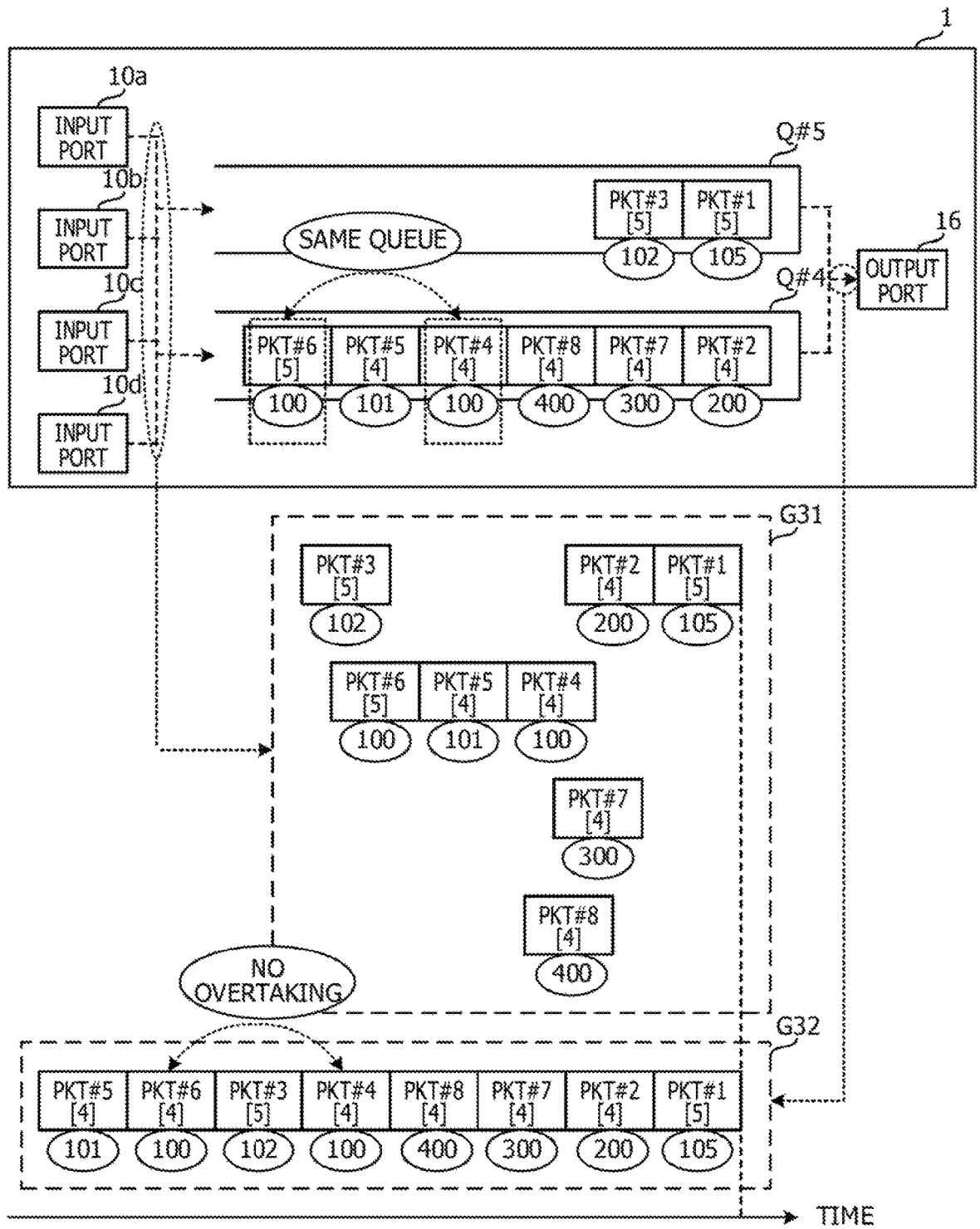
FIG. 11 illustrates an example of an operation of inhibiting packet overtaking.

FIG. 11 illustrates an example of an operation of inhibiting the packet overtaking. Details illustrated in FIG. 11 and common to those illustrated in FIG. 10 are not described below.

A reference sign G31 indicates time when the packets are input from the input ports 10a to 10d, while a reference sign G32 indicates time when the packets are output to the output port 16. The time indicated by the reference sign G31 is the same as the time indicated by the reference sign G21.

In this example, the PKT #6 is input to the same high-priority queue Q #4 as the preceding PKT #4. Since the PKTs #4 and #6 are read from the high-priority queue Q #4 in the order in which the PKTs #4 and #6 have been input to the high-priority queue Q #4, the preceding PKT #4 is output earlier than the PKT #6. This inhibits the packet overtaking.

In this case, the input, section 140 selects, based on the VID table 149, the high-priority queue Q #4 as an input destination queue to which the PKT #6 is to be input. When the input section 140 requests the queue manager 147 to search for the VID "100" from the VID table 149, and the VID "100" is already registered in the VID table 149, the input section 140 selects the same, high-priority queue Q #4 as the stored PKT #4 with the VID "100".

Figure 12:
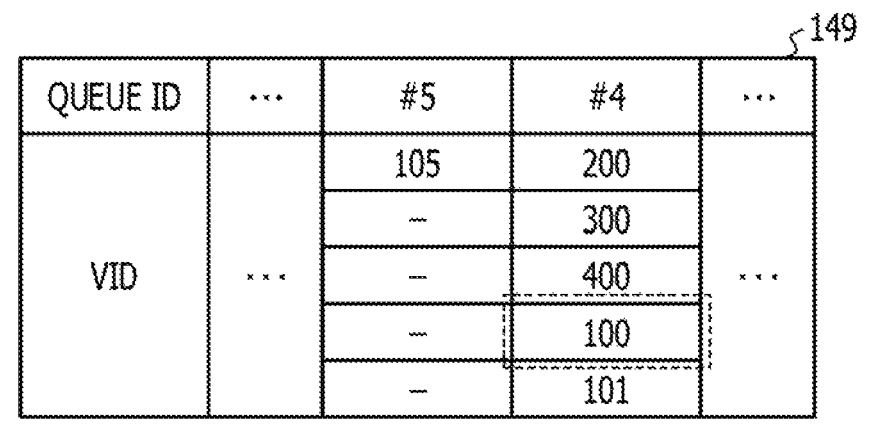

FIG. 12 illustrates an example of the VID table 149 FIG. 12 illustrates only VIDs of packets that are already stored in columns for queue IDs #4 and #5 of the high-priority queues Q #4 and Q #5 at a time point when the PKT #6 is input.

The input section 140 compares the VID "100" of the PKT #6 with the VIDs registered in the VID table 149 and determines whether a stored packet with the matching VID exists. Thus, the input section 140 requests the queue manager 147 to search for the VID "100".

The input section 140 detects the VID "100" associated with the queue ID #4 as a result of the search (refer to a dotted frame), Thus, the input section 140 selects the high-priority queue Q #4 as the input destination queue to which the PKT #6 is to be input. When the input section 140 does not detect the VID "100", the input section 140 selects the high-priority queue Q #5 corresponding to the priority of 5 as the input destination queue to which the PKT #6 is to be input.

As described above, when the input section 140 determines whether a stored packet with a matching VID stored in the VID table 149 exists, and the concerned packet exists as a result of the determination, the input section 140 inputs a packet to a queue storing the concerned packet. When the concerned packet does not exist, the input section 140 inputs the packet to a high-priority queue 141 corresponding to the priority of the packet. Therefore, even when a priority of a packet is increased by the priority changer 145, the packet is input to a high-priority queue 141 storing a preceding packet with the same VID in a downstream-side layer 2 switch 1, and the packet does not overtake the preceding packet.

Figure 13:
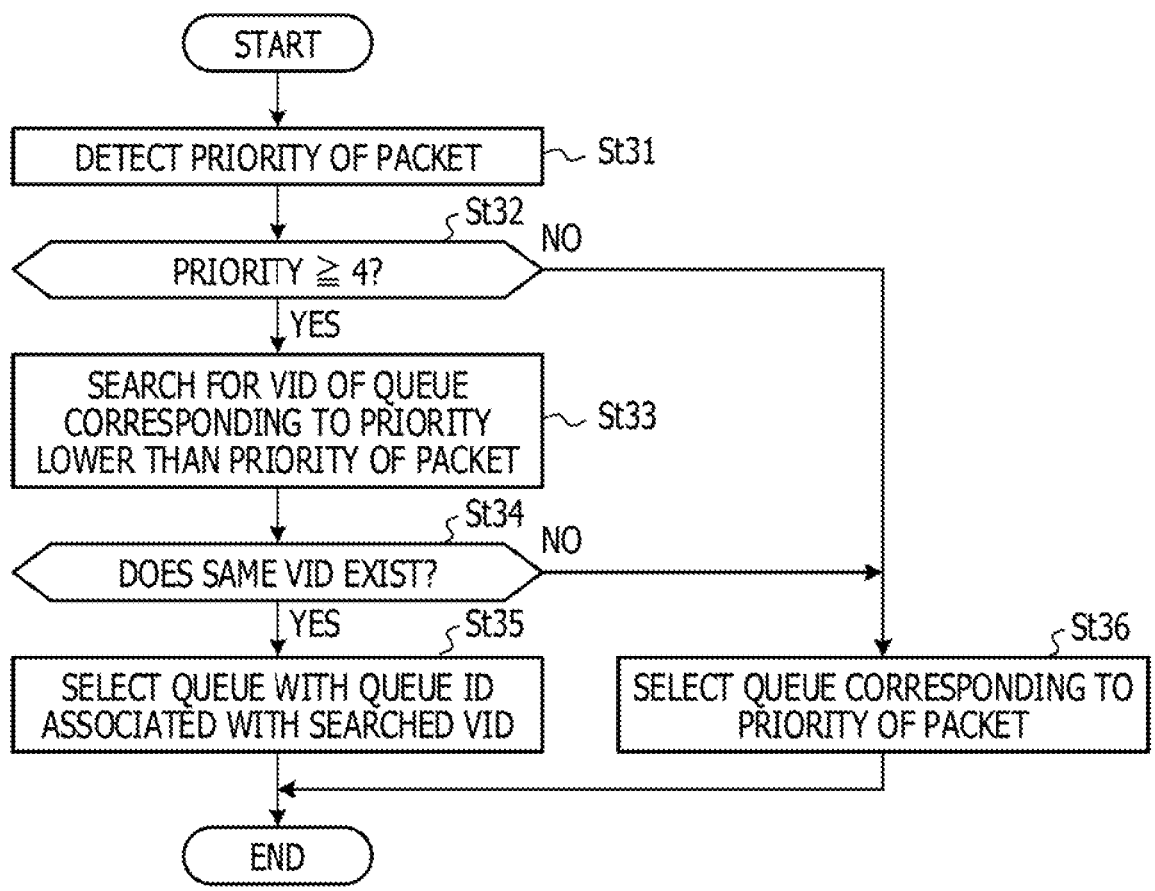
FIG. 13 is a flowchart illustrating an example of a process of selecting a high-priority queue as an input destination of a packet.

FIG. 13 is a flowchart illustrating an example of a process of selecting a high-priority queue 141 as an input destination of a packet. The process is executed in step St3 illustrated in FIG. 5, for example.

The input section 140 detects the priority of the packet from, for example, the VLAN tag of the packet (in step St31). Then, the input section 140 determines whether the priority is 4 or greater (in step St32). Thus, the input section 140 determines whether the packet is a high-priority packet.

When the priority of the packet is 3 or less (No in step St32) or when the packet is a low-priority packet, the input section 140 selects a low-priority queue 142 corresponding to the priority of the packet as an input destination queue (in step St36).

When the priority of the packet is 4 or greater (Yes in step St32) or when the packet is a high-priority packet, the input section 140 requests the queue manager 147 to search for a VID for a queue ID of a high-priority queue 141 corresponding to a priority lower than the priority of the packet (in step St33). The queue manager 147 searches for the VID from the VID table 149 in response to, the request, In the example illustrated in FIG. 12, since the priority of the PKT #6 to be input is 5, a VID is searched for the queue ID #4 of the high-priority queue 141 corresponding to the priority of 4.

As described in the example, by limiting a search range within tide VID table 149 to a VID for a queue ID of a high-priority queue 141 corresponding to a priority lower than a priority of a packet, a time period for the search is reduced, compared to the, case where VIDs for all the queue IDs are searched. The search, however, is not limited to this. The VIDs for all the queue IDs may be searched.

Then, the input section 140 determines, based on a result, of the search, whether the same VID as that of the packet to be input exists in the VID table 149 (in step St34). When the same VID does not exist (No in step St34), the input section 140 selects a low-priority queue 142 corresponding to the priority of the packet as the input destination queue (in step St36).

When the same VID exists (Yes in step St34), the input section 140 selects, as the input destination queue of the packet, a high-priority queue 141 with a queue ID associated with the VID searched from the VID table 149 (in step St35). Thus, since a preceding packet with a VID and a succeeding packet with the same VID are input to the same high-priority queue 141, the succeeding packet is inhibited from overtaking the preceding packet. In this manner, the process of selecting an input destination queue of a packet is executed.

This example describes the case where the VIDs are used as the identification information of the paths Pa and Pb through which packets are transferred. The identification information, however, is not limited to this. As the identification information of the paths Pa and Pb, for example, combinations of SAs and DAs or label values of MPLS-Transport Profile (TP) may be used.

(Communication System)

Figure 14:
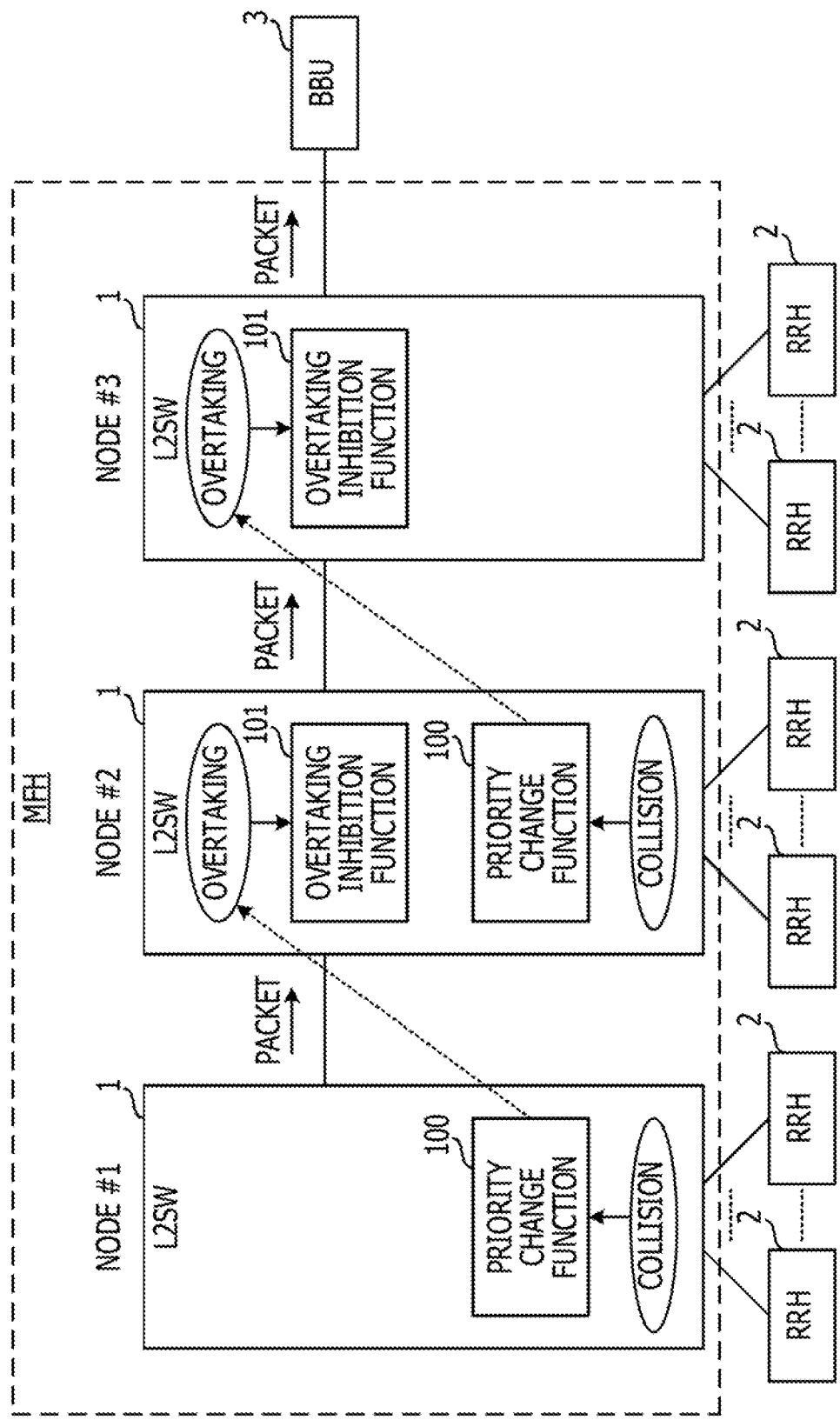
FIG. 14 illustrates an example of a configuration of a communication system.

FIG. 14 illustrates an example of a configuration of the communication system. In an MFH region of the communication system, the layer 2 switches 1 of the nodes #1 to #3 are installed. The layer 2 switches 1 are coupled to each other in series, and RRHs 2 are installed so that multiple RRHs 2 belong to each of the layer 2 switches 1. Each of the RRHs 2 transmits a packet to a layer 2 switch 1 to which the RRH 2 belongs.

The layer 2 switch 1 of the node #1 executes time division multiplexing on packets from the RRHs 2 belonging to the layer 2 switch 1 of the node #1 and transmits the packets to the layer 2 switch 2 of the downstream-side node #2. The layer 2 switch 1 of the node #2 executes time division multiplexing on the packets from the node #1 and packets from the RRHs 2 belonging to the layer 2 switch 1 of the node #2 and transmits the packets to the layer 2 switch 1 of the downstream-side node #3. The layer 2 switch 1 of the node #3 executes time division multiplexing on the packets from the node #2 and packets from the RRHs 2 belonging to the layer 2 switch 1 of the node #3 and transmits the packets to the downstream-side BBU 3.

In the layer 2 switch 1 of the node #1, two or more the packets from the RRHs 2 collide with each other, and thus a priority change function 100 is executed by the priority changer 145. To inhibit packet overtaking (refer to a dotted arrow) caused by a change in a priority in the node #1, an overtaking inhibition function 101 is executed by the input section 140 in the layer 2 switch 1 of the downstream-side node #2.

In the layer 2 switch 1 of the node #2, one or more of the packets from the RRHs 2 and one or more of the packets from the node #1 collide with each other in the layer 2 switch 1 of the node #2, a priority change function 100 is executed by the priority changer 145. To inhibit packet overtaking (refer to a dotted arrow) caused by a change in a priority in the node #2, an overtaking inhibition function 101 is executed by the input section 140 in the layer 2 switch 1 of the downstream-side node #3.

Although one or more of the packets from the RRHs 2 and one or more of the packets from the node #2 collide with each other in the layer 2 switch 1 of the node #3, a layer 2 switch 1 is not installed on the downstream side of the node #3 and a priority change function 100 is not executed in the layer 2 switch 1 of the node #3.

As described above, since a layer 2 switch 1, which is installed on the upstream side of a layer 2 switch 1 in which packets collide with each other, executes a priority change function 100, a collision delay be suppressed. Since the layer 2 switches 1 of the nodes #1 and #2 execute the priority change functions 100, collision delays caused by the collisions between the packets may be uniformly suppressed without bias to delays of some packets.

Since a layer 2 switch 1, which is installed on the downstream side of a layer 2 switch 1 that has executed a priority change function 100, executes an overtaking inhibition function 101, packet overtaking may be inhibited. The layer 2 switches 1 of the nodes #1 and #2 are an example of a first communication device and an example of a second communication device, respectively. The layer 2 switches 1 of the nodes #2 and #3 are an example of the first communication device and an example of the second communication device, respectively.

The foregoing embodiment is a preferred embodiment of the disclosure. The embodiment, however, is not limited to this and may be variously modified and changed without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device comprising:
   multiple queues, each of which stores a packet;
   an input section configured to input a concerned packet to a queue that is among the multiple queues and corresponds to a priority value included in the concerned packet;
   an adder configured to a first time point to add the acquired first time point to the concerned packet, the first time point being a time point when the concerned packet is input to the queue corresponding to the priority value included in the concerned packet;
   a reader configured to read packets from each of the multiple queues in order from a packet with the highest priority;
   a calculator configured to acquire, in response that the concerned packet is read from the queue, a second time point to calculate delay time of the concerned packet by using the difference between the first time point and the second time point, the second time point being a time point when the concerned packet is read from the queue corresponding to the priority value included in the concerned packet; and
   a priority controller configured to modify, in response to the delay time being larger than a threshold, the priority value included in the concerned packet.

2. The communication device according to claim 1, wherein
   the priority controller is configured to modify, in response that the delay time is longer than the threshold, the priority value included in the concerned packet by increasing the priority value.

3. The communication device according to claim 1, further comprising:
   a counter configured to count time within the communication device, wherein the adder is configured to acquire the first time from the counter, and
the calculator is configured to acquire the second time from the counter.

4. The communication device according to claim 1, wherein
   the priority controller is configured to
      determine, in response that the priority value included in the concerned packet is equal to or higher than a predetermined value, whether the delay time is longer than the threshold, and
      modify, in response that the delay time is longer than the threshold, the priority value included in the concerned packet.

5. The communication device according to claim 1, further comprising:
   multiple receiving ports configured to receive packets, wherein
   the input section is configured to input the packets received by the multiple receiving ports to corresponding queues, each of the corresponding queue being a queue among the multiple queues and associated with a respective priority value included in the received packets.

6. A communication system comprising:
   a first communication device that transmits a packet; and
   a second communication device that receives the packet from the first communication device, wherein
   the first communication device includes
   multiple first queues, each of which stores a packet,
   a first input section configured to input a concerned packet to a first queue that is among the multiple first queues and corresponds to a priority value included in the concerned packet,
   an adder configured to acquire a first time point to add information on the acquired first time point to the concerned packet, the first time point being a time point when the concerned packet is input to the first queue corresponding to the priority value included in the concerned packet;
   a first reader configured to read packets from each of the multiple first queues in order from a packet with the highest priority,
   a calculator configured to acquire, in response that the concerned packet is read from the queue, a second time point to calculate delay time of the concerned packet by using the difference between the first time point and the second time point, the second time point being a time point when the concerned packet is read from the first queue corresponding to the priority value included in the concerned packet;
   a priority controller configured to modify, in response to the delay time being larger than a threshold, the priority value included in the concerned packet, and
   a transmitting port configured to transmit the packets read from the multiple first queues, wherein the packets to be transmitted from the transmitting port includes the concerned packet attached the priority value modified in response the delay time being larger than the threshold,
   the second communication device includes
   multiple second queues that store the packets transmitted by the first communication device,
   a second input section configured to input the concerned packet to one of the multiple second queues, an acquirer configured to acquire, from the concerned packet, identification information of a path through which the concerned packet is transferred, a storage section configured to store identification information of the packets stored in the multiple second queues, and a second reader configured to read the packets from each of the multiple second queues in order from a packet with the highest priority, the second input section is configured to compare the identification information of the packets input to the multiple second queues with the identification information stored in the storage section and determine whether a certain stored packet having identification information matching identification information stored in the storage section exists among the packets input to the multiple second queues, and input the concerned packet to a second queue storing the certain stored packet when the certain stored packet exists as a result of the determination, and input the concerned packet to a second queue corresponding to the priority value of the concerned packet when the certain stored packet does not exists as a result of the determination.

7. A communication method comprising:

inputting a concerned packet to a queue that corresponds to a priority value included in the concerned packet and is among multiple queues, which of which stores a packet;

acquiring a first time point to add information on the acquired first time point to the concerned packet, the first time point being a time point when the concerned packet is input to the queue corresponding to the priority value included in the concerned packet;

reading packets from the multiple queues in order from a packet with the highest priority;

acquiring, in response that the concerned packet is read from the queue, a second time point to calculate delay time of the concerned packet by using a difference between the first time point and the second time point, the second time point being a time point when the concerned packet is read from the queue corresponding to the priority value included in the concerned packet; and modifying, in response to the delay time being larger than a threshold, the priority value included in the concerned packet.

* * * * *